US011894618B2

(12) United States Patent
Suzuki et al.

(10) Patent No.: US 11,894,618 B2
(45) Date of Patent: Feb. 6, 2024

(54) ANTENNA DEVICE AND PHASED ARRAY ANTENNA DEVICE

(71) Applicant: Japan Display Inc., Tokyo (JP)

(72) Inventors: Daiichi Suzuki, Tokyo (JP); Mitsutaka Okita, Tokyo (JP); Emi Higano, Tokyo (JP)

(73) Assignee: Japan Display Inc., Tokyo (JP)

( * ) Notice: Subject to any disclaimer, the term of this patent is extended or adjusted under 35 U.S.C. 154(b) by 324 days.

(21) Appl. No.: 17/447,601

(22) Filed: Sep. 14, 2021

(65) Prior Publication Data

US 2021/0408681 A1 Dec. 30, 2021

Related U.S. Application Data

(63) Continuation of application No. PCT/JP2019/047668, filed on Dec. 5, 2019.

(30) Foreign Application Priority Data

Mar. 15, 2019 (JP) ................................ 2019-048618

(51) Int. Cl.
*H01P 1/18* (2006.01)
*H01Q 3/36* (2006.01)
(Continued)

(52) U.S. Cl.
CPC ................ *H01Q 3/36* (2013.01); *H01Q 1/38* (2013.01); *H01Q 1/50* (2013.01)

(58) Field of Classification Search
CPC . H01P 1/18; H01P 1/181; H01P 1/184; H01Q 3/30; H01Q 3/36; H01Q 3/46;
(Continued)

(56) References Cited

U.S. PATENT DOCUMENTS

| | | | | |
|---|---|---|---|---|
| 11,011,854 | B2 * | 5/2021 | Haziza | H01Q 3/44 |
| 2004/0067013 | A1 * | 4/2004 | Gu | G02F 1/292 349/193 |
| 2017/0192306 | A1 * | 7/2017 | Song | G02F 1/133753 |

FOREIGN PATENT DOCUMENTS

| | | |
|---|---|---|
| JP | 11-103201 A | 4/1999 |

OTHER PUBLICATIONS

International Search Report dated Jan. 28, 2020 in PCT/JP2019/047668 filed on Dec. 5, 2019, 2 pages.

* cited by examiner

*Primary Examiner* — Thai Pham
(74) *Attorney, Agent, or Firm* — Maier & Maier, PLLC

(57) ABSTRACT

An antenna device includes a strip conductor layer, a radiation conductor layer continuous from the strip conductor layer, a ground conductor layer facing the strip conductor layer and the radiation conductor layer, a liquid crystal layer between the strip conductor layer and the ground conductor layer, and the radiation conductor layer and the ground conductor layer, and an alignment film between the strip conductor layer and the liquid crystal layer, and the radiation conductor layer and the liquid crystal layer. The alignment film includes a first region overlapping the strip conductor layer and a second region overlapping the radiation conductor layer, and the alignment state of liquid crystal molecules of the liquid crystal layer in the first region is different from the alignment state of liquid crystal molecules of the liquid crystal layer in the second region.

17 Claims, 11 Drawing Sheets

(51) Int. Cl.
*H01Q 1/38* (2006.01)
*H01Q 1/50* (2006.01)

(58) Field of Classification Search
CPC .......... H01Q 3/2658; H01Q 1/38; H01Q 1/50; H01Q 21/065
See application file for complete search history.

ANTENNA DEVICE AND PHASED ARRAY ANTENNA DEVICE

CROSS-REFERENCE TO RELATED APPLICATIONS

This application is a Continuation of International Patent Application No. PCT/JP2019/047668, filed on Dec. 5, 2019, which claims priority to Japanese Patent Application No. 2019-048618, filed on Mar. 15, 2019, the disclosures of which are incorporated herein by reference for all purposes as if fully set forth herein.

FIELD

An embodiment of the present invention relates to an antenna device including a phase shifter and a planar antenna element.

BACKGROUND

A phased array antenna device can control the radiation directivity of an antenna while fixing the direction of the antenna in one direction by controlling the amplitude and phase of each high frequency signal when applying each high frequency signal to a part or all of a plurality of antenna elements. The phased array antenna device includes a phase shifter for controlling the phase of the high frequency signal applied to the antenna element.

Various types of phase shifters are used such as a method of physically changing the length of a transmission line to change the phase of the high frequency signal, a method of changing the impedance in the middle of a transmission line and changing the phase of a high frequency by reflection, and a method of generating a signal having a desired phase by controlling and combining the gain of an amplifier that amplifies two signals having different phases. In addition to these, as an example of a phase shifter, there is disclosed a method utilizing a property peculiar to a liquid crystal material, in which a dielectric constant changes according to an applied voltage (for example, Japanese Patent Application Laid-Open No. H11-103201).

However, when a phase shifter using a liquid crystal material as a variable dielectric layer and a planar antenna element are integrated, if the dielectric constant of the dielectric layer in the phase shifter is changed, the frequency output from the patch antenna element changes.

SUMMARY

An antenna device in an embodiment according to the present invention includes a strip conductor layer, a radiation conductor layer continuous from the strip conductor layer, a ground conductor layer facing the strip conductor layer and the radiation conductor layer, a liquid crystal layer between the strip conductor layer and the ground conductor layer, and the radiation conductor layer and the ground conductor layer, and an alignment film between the strip conductor layer and the liquid crystal layer, and the radiation conductor layer and the liquid crystal layer. The alignment film includes a first region overlapping the strip conductor layer and a second region overlapping the radiation conductor layer, and the alignment state of liquid crystal molecules of the liquid crystal layer in the first region is different from the alignment state of liquid crystal molecules of the liquid crystal layer in the second region.

An antenna device in an embodiment according to the present invention includes a strip conductor layer, a radiation conductor layer continuous from the strip conductor layer, a ground conductor layer facing the strip conductor layer and the radiation conductor layer, a liquid crystal layer between the strip conductor layer and the ground conductor layer, and the radiation conductor layer and the ground conductor layer, and an alignment film in contact with the liquid crystal layer. The alignment film is in contact with the strip conductor layer and exposes the radiation conductor layer.

An antenna device in an embodiment according to the present invention includes a strip conductor layer, a radiation conductor layer continuous from the strip conductor layer, a ground conductor layer facing the strip conductor layer and the radiation conductor layer, a liquid crystal layer between the strip conductor layer and the ground conductor layer, and the radiation conductor layer and the ground conductor layer, and an alignment film between the strip conductor layer and the liquid crystal layer, and the radiation conductor layer and the liquid crystal layer. The alignment film aligns the liquid crystal molecules of the liquid crystal layer in a first region overlapping the strip conductor layer, and randomly aligns the alignment of the liquid crystal molecules of the liquid crystal layer in a second region overlapping the radiation conductor layer.

A phased array antenna device in an embodiment according to the present invention includes a plurality of antenna devices, the plurality of antenna devices includes any one of the configurations of the antenna devices as mentioned above. Each radiation conductive layer of the plurality of antenna devices is radially arranged.

DESCRIPTION OF EMBODIMENTS

Figure 1A:
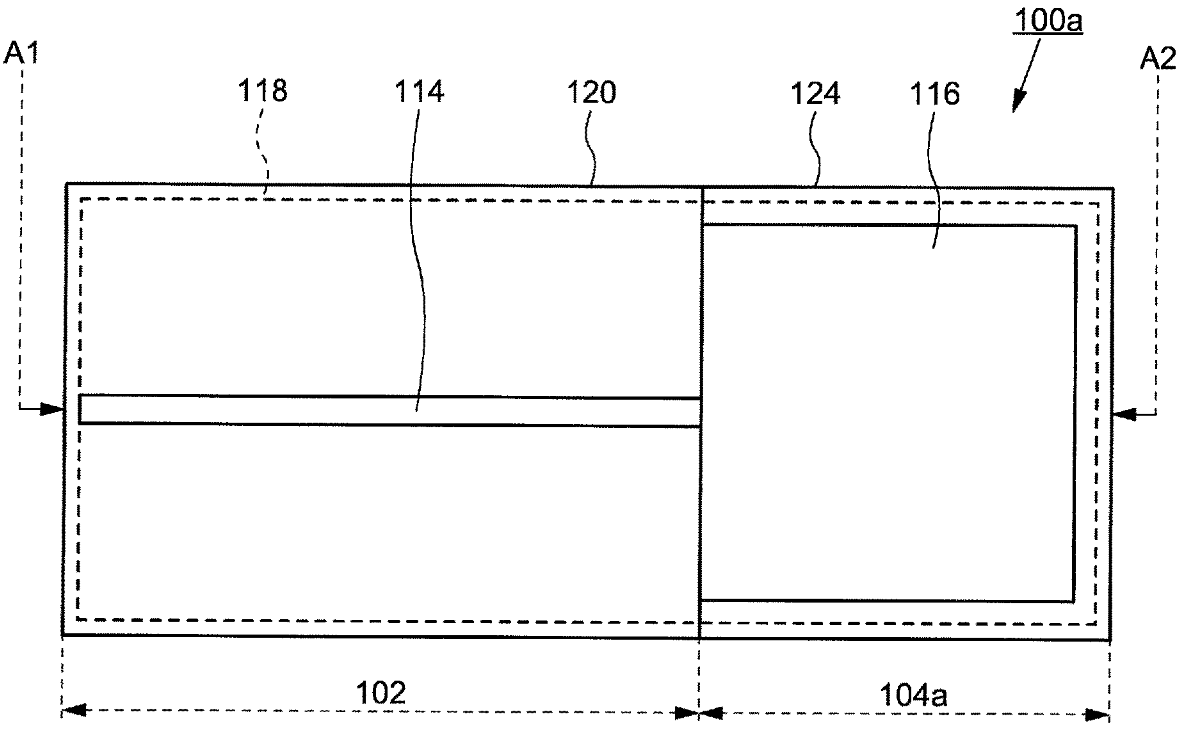
FIG. 1A shows a plan view of an antenna device according to an embodiment of the present invention.

Hereinafter, embodiments of the present invention will be described with reference to the drawings and the like. The present invention may be carried out in various forms without departing from the gist thereof, and is not to be construed as being limited to any of the following embodiments. Although the drawings may schematically represent the width, thickness, shape, and the like of each part in comparison with the actual embodiment in order to clarify the description, they are merely examples and do not limit the interpretation of the present invention. In the present specification and each of the figures, elements similar to those described previously with respect to the figures already mentioned are designated by the same reference numerals (or numbers followed by a, b, etc.), and a detailed description thereof may be omitted as appropriate. Furthermore, the characters “first” and “second” appended to each element are convenient signs used to distinguish each element, and have no further meaning unless specifically described.

As used herein, where a member or region is “on” (or “below”) another member or region, this includes cases where it is not only directly on (or just under) the other member or region but also above (or below) the other member or region, unless otherwise specified. That is, it includes the case where another component is included in between above (or below) other members or regions.

First Embodiment

This embodiment shows the structure of an antenna device including a phase shifter using a liquid crystal layer as a variable dielectric layer and a planar antenna element using the liquid crystal layer as a dielectric layer.

1-1. Structure of Antenna Device

Figure 1B:
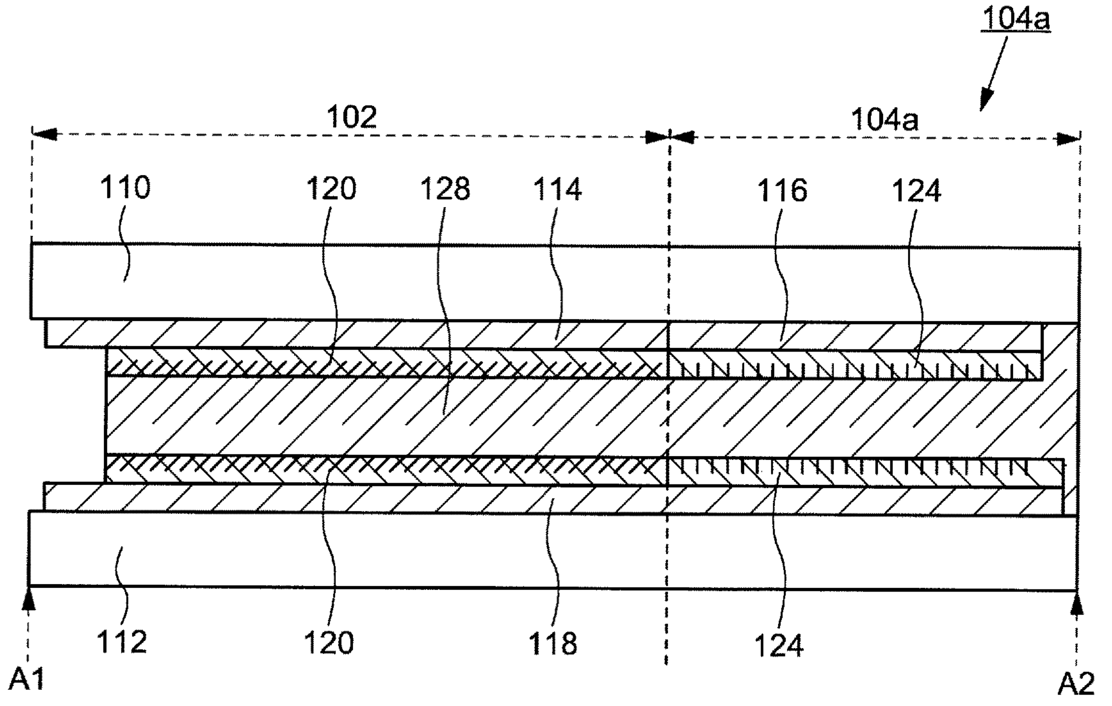
FIG. 1B shows a cross-sectional structure of an antenna device according to an embodiment of the present invention along the line A1-A2 shown in FIG. 1A.

FIG. 1A is a schematic plan view of an antenna device 100*a* according to this embodiment, and FIG. 1B is a schematic sectional view along line A1-A2. The antenna device 100*a* includes a phase shifter 102 and a planar antenna element 104*a*. The phase shifter 102 has a function of shifting the phase of the input high frequency signal, and the planar antenna element 104*a* has a function as an antenna for radiating the high frequency signal to the air or receiving the high frequency signal. The phase shifter 102 and the planar antenna element 104*a* include a conductive film formed in the surfaces of a first substrate 110 and a second substrate 112, and a liquid crystal layer sandwiched between the first substrate 110 and the second substrate 112. The phase shifter 102 and the planar antenna element 104*a* have an integrated structure.

The phase shifter 102 includes a strip conductor layer 114, a ground conductor layer 118, the liquid crystal layer 128 as a variable dielectric layer, and a first alignment film 120. The strip conductor layer 114 is disposed on the first substrate 110, and the ground conductor layer 118 is disposed on the second substrate 112. The strip conductor layer 114 and the ground conductor layer 118 are oppositely arranged with a gap, and the liquid crystal layer 128 is disposed in the gap. The first alignment film 120 is disposed between the strip conductor layer 114 and the liquid crystal layer 128, and between the ground conductor layer 118 and the liquid crystal layer 128, respectively. The strip conductor layer 114 is formed of an elongated conductor pattern to form a microstrip line that propagates high frequencies.

The planar antenna element 104*a* includes a radiation conductor layer 116, the ground conductor layer 118, the liquid crystal layer 128 as a dielectric layer, and a second alignment film 124. The radiation conductor layer 116 is disposed on the first substrate 110, and the ground conductor layer 118 is disposed on the second substrate 112. The radiation conductor layer 116 and the ground conductor layer 118 are disposed to be opposed to each other with a gap therebetween, and the liquid crystal layer 128 is disposed in the gap. The second alignment film 124 is disposed between the radiation conductor layer 116 and the liquid crystal layer 128, and between the ground conductor layer 118 and the liquid crystal layer 128, respectively. The radiation conductor layer 116 is formed of a rectangular conductor pattern corresponding to the wavelength of the electromagnetic wave which is radiated or absorbed.

As shown in FIG. 1B, the ground conductor layer 118 and the liquid crystal layer 128 are disposed as members common to the phase shifter 102 and the planar antenna element 104*a*. That is, the ground conductor layer 118 is disposed on the second substrate 112 so as to extend continuously from a region of the phase shifter 102 to a region of the planar antenna element 104*a*. The liquid crystal layer 128 is disposed so as to fill a space between the first substrate 110 and the second substrate 112 which are arranged to be opposed to each other with a gap therebetween. The radiation conductor layer 116 is disposed so as to be continuous from the strip conductor layer 114. The strip conductor layer 114 and the radiation conductor layer 116 are different in function and shape, but can be formed of the same conductive film provided on the first substrate 110.

A metal film is used as a conductive film for forming the strip conductor layer 114, the radiation conductor layer 116, and the ground conductor layer 118. A metal material such as aluminum (Al), copper (Cu), gold (Au), silver (Ag) or an alloy material containing these metal materials can be used as the metal film. The strip conductor layer 114, the radiation conductor layer 116, and the ground conductor layer 118 may have a structure in which a core is formed of the metal film using these metal materials, and the upper and lower layers of the core are covered with a high melting point metal film such as titanium (Ti) or molybdenum (Mo).

Various liquid crystal materials are used for the liquid crystal layer 128. Many liquid crystal materials have dielectric anisotropy. When liquid crystal materials are classified by dielectric anisotropy, both positive liquid crystals (liquid crystals with positive dielectric anisotropy) in which the dielectric anisotropy of rod-shaped liquid crystal molecules is large in the long axis direction and small in the short axis direction perpendicular to the long axis direction and negative liquid crystals (liquid crystals with negative dielectric anisotropy) in which the dielectric anisotropy of rod-shaped liquid crystal molecules is small in the long axis direction and large in the short axis direction can be used. Both positive type liquid crystals and negative type liquid crystals can be used for the liquid crystal layer 128. For example, nematic liquid crystal, smectic liquid crystal, cholesteric liquid crystal and discotic liquid crystal can be used as such a liquid crystal material.

Different types of alignment films are used for the first alignment film 120 and the second alignment film 124. For example, when a positive liquid crystal is used for the liquid crystal layer 128, a horizontal alignment film (a film for aligning the long axis direction of liquid crystal molecules parallel to the main surface of the substrate) is applied as the first alignment film 120, and a vertical alignment film (a film for aligning the long axis direction of liquid crystal molecules perpendicular to the main surface of the substrate) is applied as the second alignment film 124. When a negative liquid crystal is used for the liquid crystal layer 128, the vertical alignment film is applied as the first alignment film 120 and the horizontal alignment film is applied as the second alignment film.

Thus, different kinds of alignment films are applied to the first alignment film 120 and the second alignment film 124, whereby the alignment state of the liquid crystal molecules can be made different in the region of the phase shifter 102 and the region of the planar antenna element 104*a*. In other words, the phase shifter 102 can use the liquid crystal layer 128 as a variable dielectric layer, and the planar antenna element 104*a* can use the liquid crystal layer 128 as a dielectric layer (dielectric constant does not change). Thus, when the antenna device 100*a* is operated, while the alignment of the liquid crystal molecules of the liquid crystal layer 128 is controlled by the phase shifter 102, the alignment of the liquid crystal molecules of the liquid crystal layer 128 can be prevented from changing in the planar antenna element 104*a*.

1-2. Structure and Operation of Phase Shifter

As shown in FIGS. 1A and 1B, the phase shifter 102 has a structure in which a liquid crystal layer 128 as a variable dielectric layer is disposed between the strip conductor layer 114 and the ground conductor layer 118 via a horizontal alignment film 122. Although not shown in FIG. 1B, spacers may be disposed between the first substrate 110 and the second substrate 112 so as to maintain a constant distance. The first substrate 110 and the second substrate 112 may be bonded with a sealing material so as to seal the liquid crystal layer 128.

The ground conductor layer 118 is held at a constant potential. For example, the ground conductor layer 118 is held in a grounded state. A high frequency signal is applied to one end (input end side) of the strip conductor layer 114. The high frequency signal has a frequency selected from a very high frequency (VHF) band, very high frequency (UHF) band, microwave (SHF) band and millimeter wave (EHF) band. The liquid crystal molecules of the liquid crystal layer 128 have dielectric anisotropy. However, since the liquid crystal molecules hardly follow the frequency of the high frequency signal input to the strip conductor layer 114, the dielectric constant of the liquid crystal layer 128 is not changed by the high frequency signal being applied.

Figure 2A:
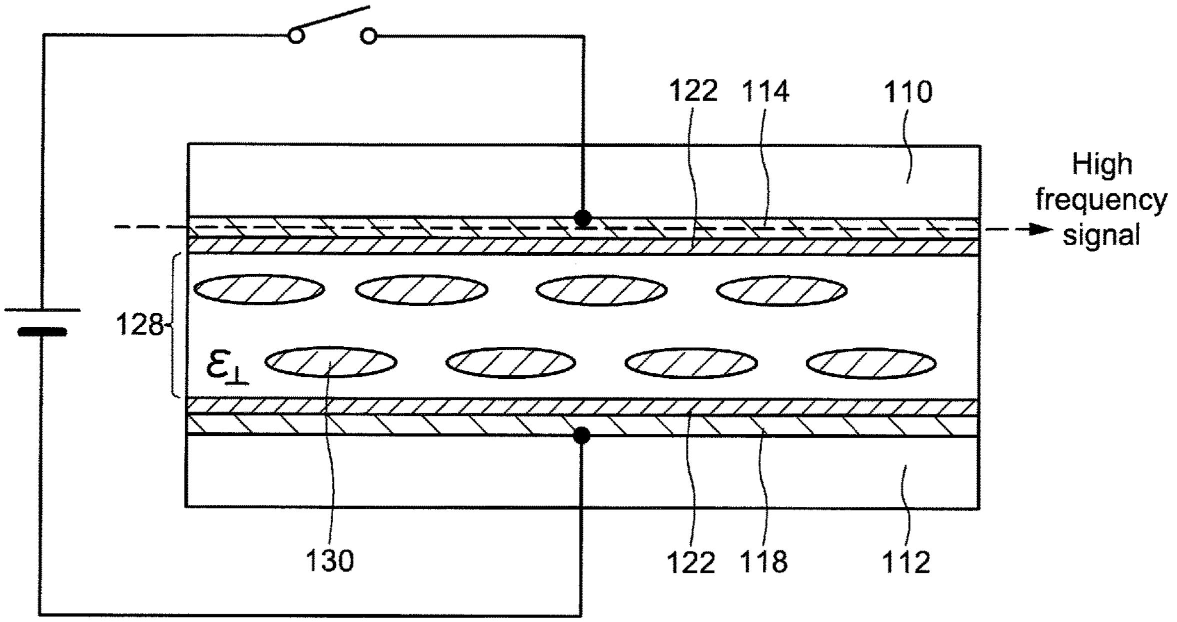
FIG. 2A is a diagram for explaining the operation of a phase shifter used in an antenna device according to an embodiment of the present invention, and shows a state in which a voltage is not applied to a liquid crystal layer as a dielectric layer.

When a DC voltage is superimposed on the high frequency signal, the potential of the strip conductor layer 114 relative to the ground conductor layer 118 changes, and the alignment of the liquid crystal molecules changes accordingly. Since the liquid crystal molecules are polar molecules and have dielectric anisotropy, the dielectric constant varies depending on the alignment state. FIG. 2A shows a state (referred to as a "first state") in which no voltage is applied between the ground conductor layer 118 and the strip conductor layer 114. It is assumed that the liquid crystal molecules 130 are aligned by the horizontal alignment film 122 in a direction parallel to the main surfaces of the first substrate 110 and the second substrate 112. The liquid crystal molecules 130 are aligned perpendicular to an electric field formed by the high frequency signal propagated through the strip conductor layer 114. FIG. 2A shows that the liquid crystal layer 114 has a first dielectric constant ($\varepsilon_{\perp}$) in a first state where a DC voltage is not applied to the strip conductor layer 114.

Figure 2B:
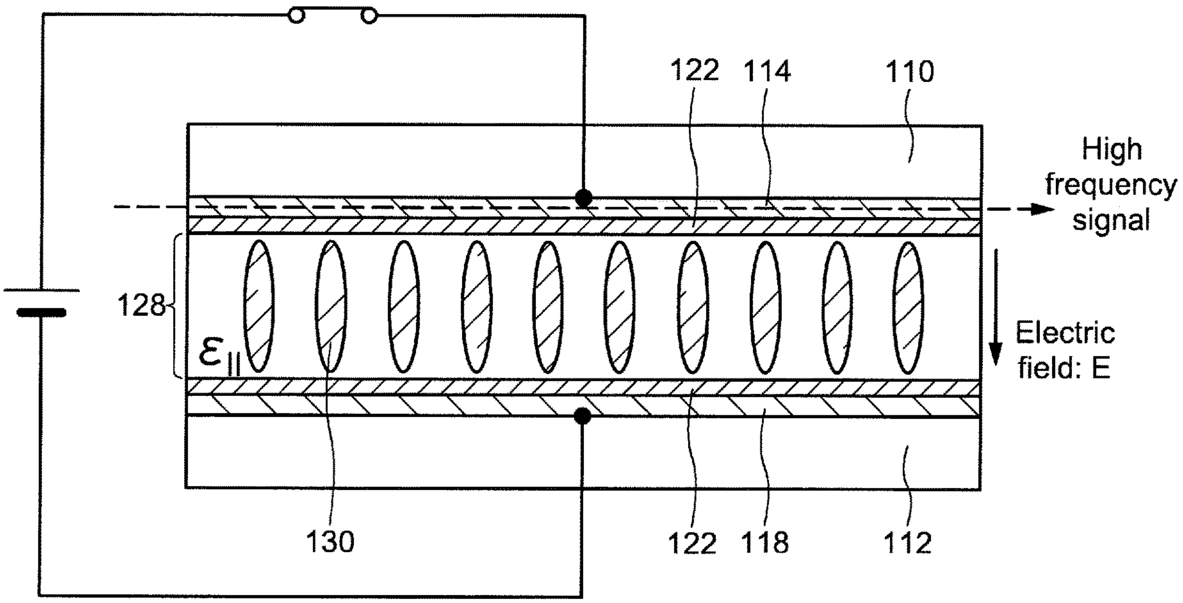
FIG. 2B is a diagram for explaining the operation of a phase shifter used in an antenna device according to an embodiment of the present invention, and shows a state in which a voltage is applied to a liquid crystal layer as a dielectric layer.

FIG. 2B shows a state ("second state") in which a voltage is applied to the strip conductor layer 114. In the second state, the liquid crystal molecules 130 are aligned in a direction perpendicular to the main surfaces of the first substrate 110 and the second substrate 112 in the long axis direction by the effect of the electric field. When the high frequency signal is applied to the strip conductor layer 114, the long axis direction of the liquid crystal molecules 130 is aligned parallel to the electric field generated by the high frequency signal. FIG. 2B shows that in the second state, the liquid crystal layer 128 has a second dielectric constant ($\varepsilon_{//}$).

The dielectric constant of the liquid crystal layer 128 is larger in the second dielectric constant ($\varepsilon_{//}$) than in the first dielectric constant ($\varepsilon_{\perp}$) ($\varepsilon_{\perp}<\varepsilon_{//}$). The phase shifter 102 has a function of changing the dielectric constant by controlling the alignment of the liquid crystal layer 128 by a bias voltage (for example, DC bias voltage) applied to the strip conductor layer 114. The phase shifter 102 has a variable dielectric layer formed by utilizing the dielectric anisotropy of the liquid crystal.

The propagation phase θ of the high frequency signal propagating through the phase shifter 102 is represented by the following equation, $$\theta=2\pi f(\varepsilon_r)^{1/2}Ls/c \quad (1)$$

where f is the frequency of the high frequency signal, $\varepsilon_r$ is the dielectric constant of the dielectric (liquid crystal), L is the length of the strip conductor layer, and c is the speed of light.

As is clear from equation (1), the propagation phase θ is proportional to the ½ power of the dielectric constant $\varepsilon_r$. Therefore, when the propagation phase in the first state is 81 and the propagation phase in the second state is 82, the difference between 82 and 81 becomes the phase shift amount. The phase shifter 102 controls the phase of the high frequency signal propagating the strip conductor layer 114 by controlling the orientation of the liquid crystal molecules 130 and changing the dielectric constant $\varepsilon_r$. FIG. 2A and FIG. 2B show two states in which the liquid crystal molecules 130 are horizontally oriented and vertically oriented, and the liquid crystal molecules 130 may take intermediate states between them. That is, the amount of phase shift of the high frequency signal can be continuously changed by continuously changing the DC voltage applied to the phase shifter 102.

1-3. Structure and Operation of Planar Antenna Element

As shown in FIG. 1A and FIG. 1B, the planar antenna element 104*a* according to this embodiment has the structure in which a liquid crystal layer 128 is disposed between the radiation conductor layer 116 and the ground conductor layer 118 via the horizontal alignment film 122. The radiation conductor layer 116 is electrically connected to the strip conductor layer 114 and radiates a high frequency signal into the air. When the bias voltage is applied to the strip conductor layer 114, the bias voltage is similarly applied to the radiation conductor layer 116.

The resonance frequency $f_r$ of the planar antenna element is shown by the following equation, $$f_r=c/(2Le(\varepsilon_r)^{1/2}) \quad (2)$$

where c is the speed of light, Le is an equivalent radiation element length, and $\varepsilon_r$ is the relative permittivity of a dielectric (liquid crystal).

As is clear from equation (2), the planar antenna element 104*a* changes the resonance frequency $f_r$ when the dielectric constant $\varepsilon_r$ of the liquid crystal layer 128 changes. That is, the resonance frequency $f_r$ is changed when the alignment state of the liquid crystal molecules 130 of the liquid crystal layer 128 in the planar antenna element 104*a* similarly changes by applying a bias voltage to the phase shifter 102.

To overcome such undesirable changes, the antenna device 100*a* according to the present embodiment uses two alignment films of different types. Hereinafter, the operation of the antenna device 100*a* will be described based on the combination of the first alignment film and the second alignment film.

1-4. Alignment Film

The antenna device 100*a* according to the present embodiment utilizes two kinds of alignment films, which are the first alignment film 120 and the second alignment film 124, as alignment films for controlling the alignment state of the liquid crystal. The relationship between the bias state of the phase shifter 102 and the alignment state of the liquid crystal layer 128 in the phase shifter 102 and the planar antenna element 104*a* will be described below.

1-4-1. Combination of Different Alignment Films

Figure 3A:
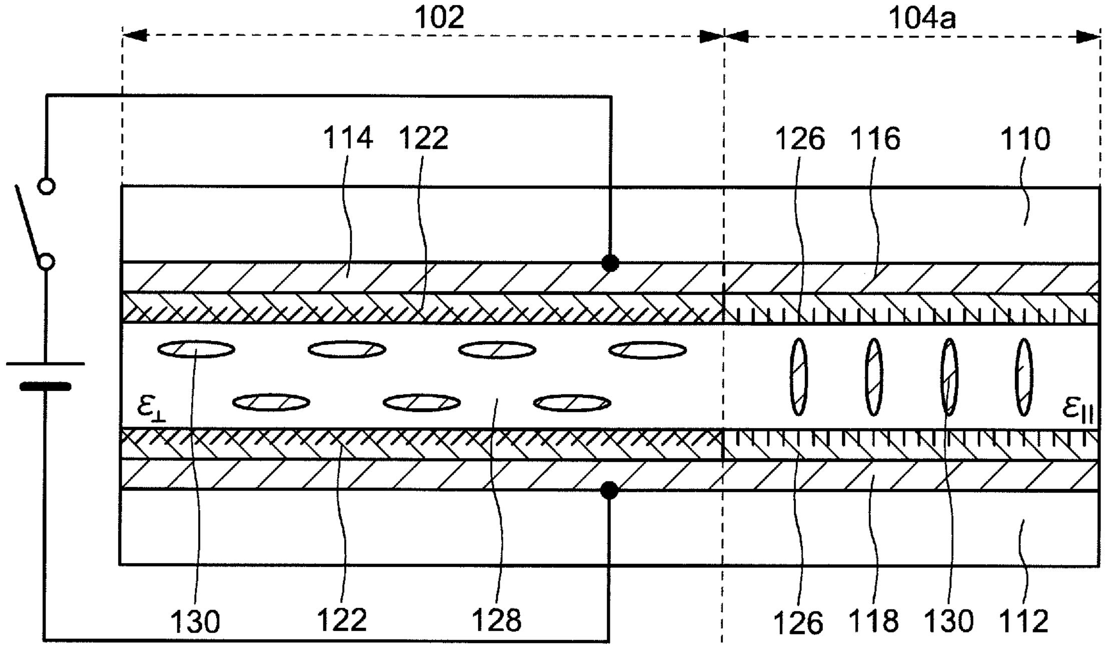
FIG. 3A shows an alignment state in which a bias voltage of liquid crystal molecules as a dielectric layer is not applied in an antenna device according to an embodiment of the present invention.

FIG. 3A schematically shows the alignment state of the liquid crystal layer 128 in the phase shifter 102 and the planar antenna element 104*a* when the bias voltage is not applied to the phase shifter 102. FIG. 3A shows a state in which the phase shifter 102 is disposed with the horizontal alignment film 122, the planar antenna element 104*a* is disposed with the vertical alignment film 126, and the liquid crystal layer 128 extends over the phase shifter 102 and the planar antenna element 104*a*. It is assumed that the liquid crystal layer 128 shown in FIG. 3A is the positive liquid crystal.

As shown in FIG. 3A, the liquid crystal layer 128 in the region of the phase shifter 102 has the liquid crystal molecules 130 aligned horizontally by the effect of the horizontal alignment film 122 (it is assumed that the long axis direction of the liquid crystal molecules is aligned in a direction substantially parallel to the main surface of the substrate; the same applies hereinafter). On the other hand, the liquid crystal layer 128 in the region of the planar antenna element 104*a* has the liquid crystal molecules 130 vertically aligned by the action of the vertical alignment film 126 (it is assumed that the long axis direction of the liquid crystal molecules is aligned in a direction substantially perpendicular to the main surface of the substrate; the same applies hereinafter).

Figure 3B:
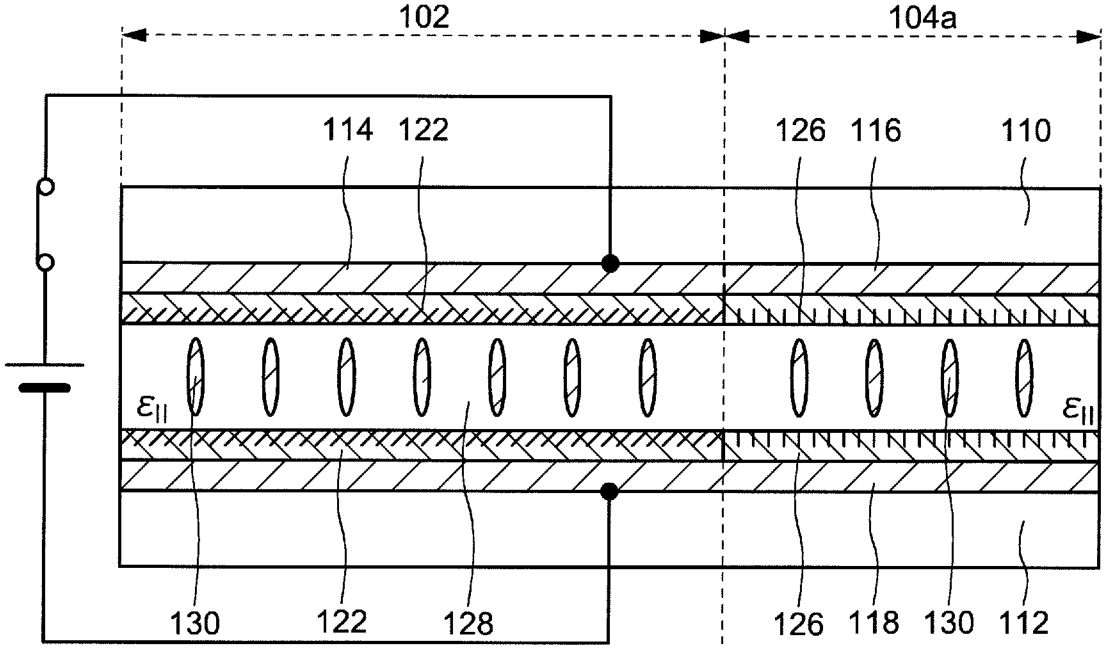
FIG. 3B shows an alignment state in which a bias voltage of liquid crystal molecules as a dielectric layer is applied in an antenna device according to an embodiment of the present invention.

FIG. 3B shows a state in which a bias voltage is applied to the phase shifter 102 with respect to FIG. 3A. More specifically, it shows a state in which a bias voltage is applied to the strip conductor layer 114. In this case, the strip conductor layer 114 and the radiation conductor layer 116 are biased to the same potential, and a DC electric field is generated between the strip conductor layer 114 and the ground conductor layer 118. The DC electric field acts on the liquid crystal layer 128.

The liquid crystal molecules 130 are vertically aligned in the liquid crystal layer 128 in the region of the phase shifter 102 by the action of the DC electric field. As described above, the phase shifter 102 can shift the phase of the high frequency signal propagating through the strip conductor layer 114, since the dielectric constant of the liquid crystal layer 128 is changed by changing the alignment of the liquid crystal molecules 130 (change from $\varepsilon_\perp$ to $\varepsilon_{//}$). On the other hand, the liquid crystal layer 128 in the region of the planar antenna element 104*a* has the liquid crystal molecules 130 aligned vertically, so that the alignment of the liquid crystal molecules 130 does not change even by the effect of the DC electric field. Therefore, the dielectric constant of the liquid crystal layer 128 in the region of the planar antenna element 104*a* does not change, and the resonance frequency of the planar antenna element 104*a* remains unchanged.

As shown in FIG. 3A and FIG. 3B, it is possible to control the phase of the high frequency signal by the phase shifter 102 and to prevent the resonance frequency from changing in the planar antenna element 104*a*, by using a positive liquid crystal as the liquid crystal layer 128, using a horizontal alignment film 122 as the phase shifter 102, and using a vertical alignment film 126 as the planar antenna element 104*a*.

Figure 4A:
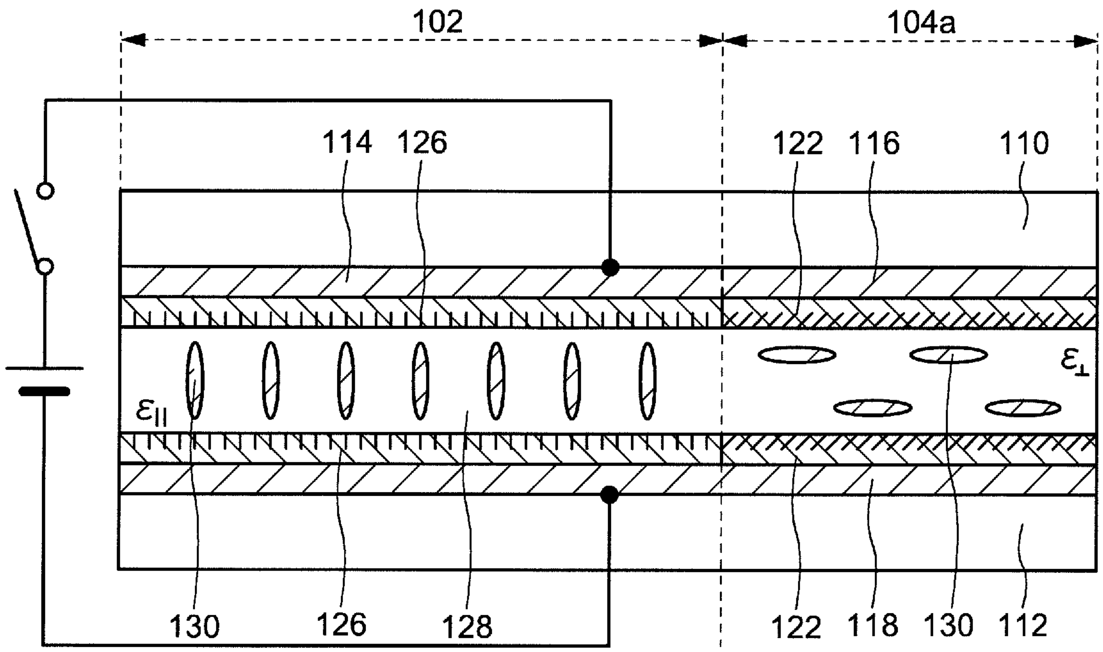
FIG. 4A shows an alignment state in which a bias voltage of liquid crystal molecules as a dielectric layer is not applied in an antenna device according to an embodiment of the present invention.

FIG. 4A shows an embodiment in which a vertical alignment film 126 is disposed in the phase shifter 102 and a horizontal alignment film 122 is disposed in the planar antenna element 104*a* when a negative liquid crystal is used for the liquid crystal layer 128. As shown in FIG. 4A, liquid crystal molecules 130 of the liquid crystal layer 128 in the region of the phase shifter 102 are vertically aligned by the effect of the vertical alignment film 126 in a state where the bias voltage is not applied. On the other hand, the liquid crystal molecules 130 of the liquid crystal layer 128 in the region of the planar antenna element 104*a* are horizontally aligned by the effect of the horizontal alignment film 122.

Figure 4B:
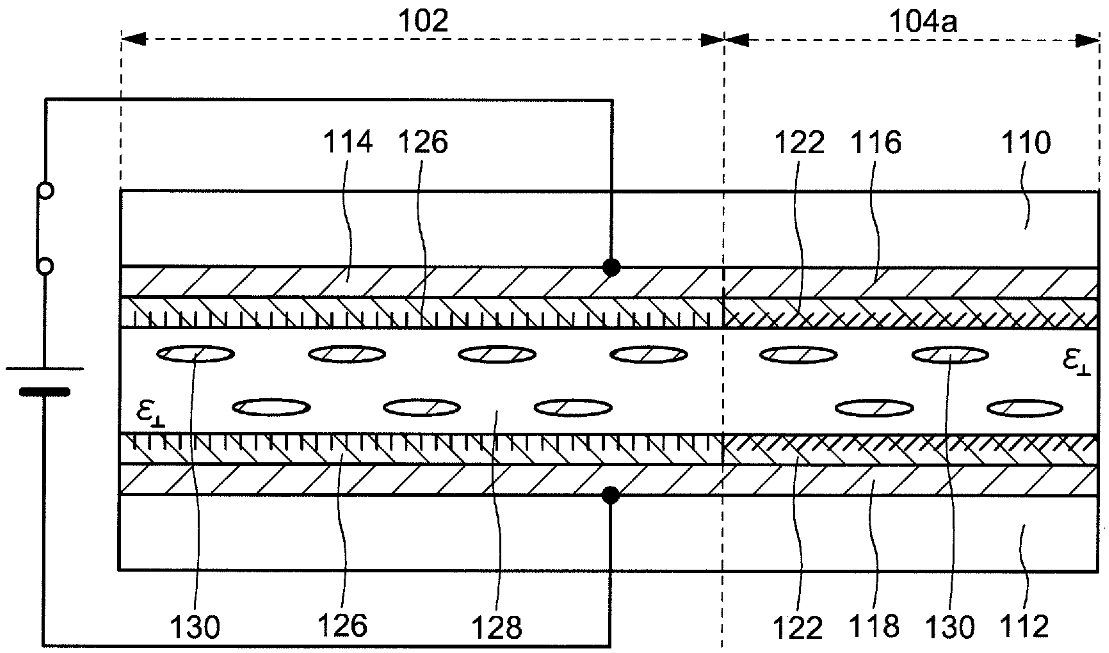
FIG. 4B shows an alignment state in which a bias voltage of liquid crystal molecules as a dielectric layer is applied in an antenna device according to an embodiment of the present invention.

FIG. 4B shows a state in which a bias voltage is applied to the phase shifter 102 with respect to FIG. 4A. The bias voltage biases the strip conductor layer 114 and the radiation conductor layer 116 to the same potential, and the DC electric field is generated between the strip conductor layer 114 and the ground conductor layer 118, and between the radiation conductor layer 116 and the ground conductor layer 118. The DC electric field acts on the liquid crystal layer 128.

The liquid crystal molecules 130 are horizontally aligned in the liquid crystal layer 128 in the region of the phase shifter 102 by the effect of the DC electric field. As described above, the dielectric constant of the liquid crystal layer 128 changes due to a change in the alignment of the liquid crystal molecules 130 (change from $\varepsilon_{//}$ to $\varepsilon_{\perp}$), so that the phase shifter 102 can shift the phase of the high frequency signal propagating through the strip conductor layer 114. On the other hand, the liquid crystal layer 128 in the region of the planar antenna element 104*a* has the liquid crystal molecules 130 aligned horizontally, so that the alignment of the liquid crystal molecules 130 does not change even by the effect of the DC electric field. Therefore, the dielectric constant of the liquid crystal layer 128 in the region of the planar antenna element 104*a* does not change, and the resonance frequency in the planar antenna element 104*a* does not change.

As shown in FIG. 4A and FIG. 4B, it is possible to control the phase of a high frequency signal by the phase shifter 102 and to prevent the resonance frequency from changing in the planar antenna element 104*a* by using a negative liquid crystal as the liquid crystal layer 128, using a vertical alignment film 126 in the phase shifter 102, and using a horizontal alignment film 122 in the planar antenna element 104*a*.

1-4-2. Horizontal Alignment Film and Vertical Alignment Film

It is possible to provide the alignment film having different characteristics by coating the first alignment film 120 and the second alignment film 124 separately, according to the structure of the antenna device 100*a* shown in FIG. 1A and FIG. 1B. For example, the horizontal alignment film can be formed as the first alignment film 120, and the vertical alignment film can be formed as the second alignment film 124. The vertical alignment film can be formed as the first alignment film 120, and the horizontal alignment film can be formed as the second alignment film 124. Such alignment films can be formed on the same substrate by using a printing method.

The horizontal alignment film and the vertical alignment film can be formed by applying and baking a polyimide based liquid composition. The alignment process of the alignment film can be performed by rubbing and photoalignment. In this case, it is preferable that the first alignment film 120 and the second alignment film 124 are subjected to different alignment processes, and therefore the other alignment film is masked when the alignment process of one alignment film is performed. In the vertical alignment film, the liquid crystal molecules can be vertically aligned even if the alignment treatment is omitted by introducing a hydrophobic group into the polyimide molecules. The fabrication process can be simplified because rubbing can be omitted when a hydrophobic group is introduced into the vertical alignment film.

1-5. Conclusion

According to this embodiment, it is possible to control the phase of the high frequency signal by the phase shifter 102 and to prevent the resonance frequency from changing by the planar antenna element 104*a* by using a plurality of kinds of alignment films having different alignment characteristics in the antenna device 100*a* in which the phase shifter 102 and the planar antenna element 104*a* are integrated. That is, the configuration of this embodiment allows the liquid crystal layer 128 to be used in common as a dielectric layer for forming the phase shifter 102 and the planar antenna element 104*a*, so that the frequency characteristic of the antenna device 100*a* does not change.

Second Embodiment

This embodiment shows a configuration different from that of the first embodiment in the antenna device including the phase shifter and the planar antenna element. In the following description, an explanation will be focused on the parts different from the first embodiment.

2-1. Structure of Antenna Device

Figure 5A:
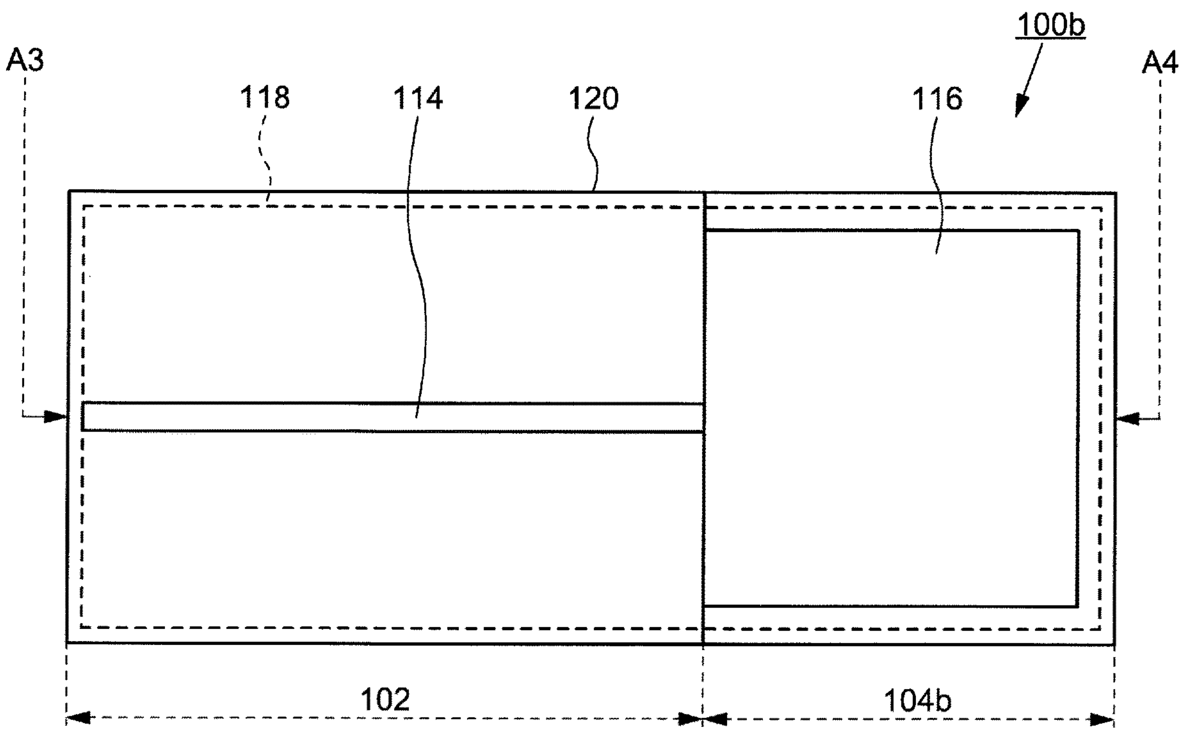
FIG. 5A shows a plan view of an antenna device according to an embodiment of the present invention.
Figure 5B:
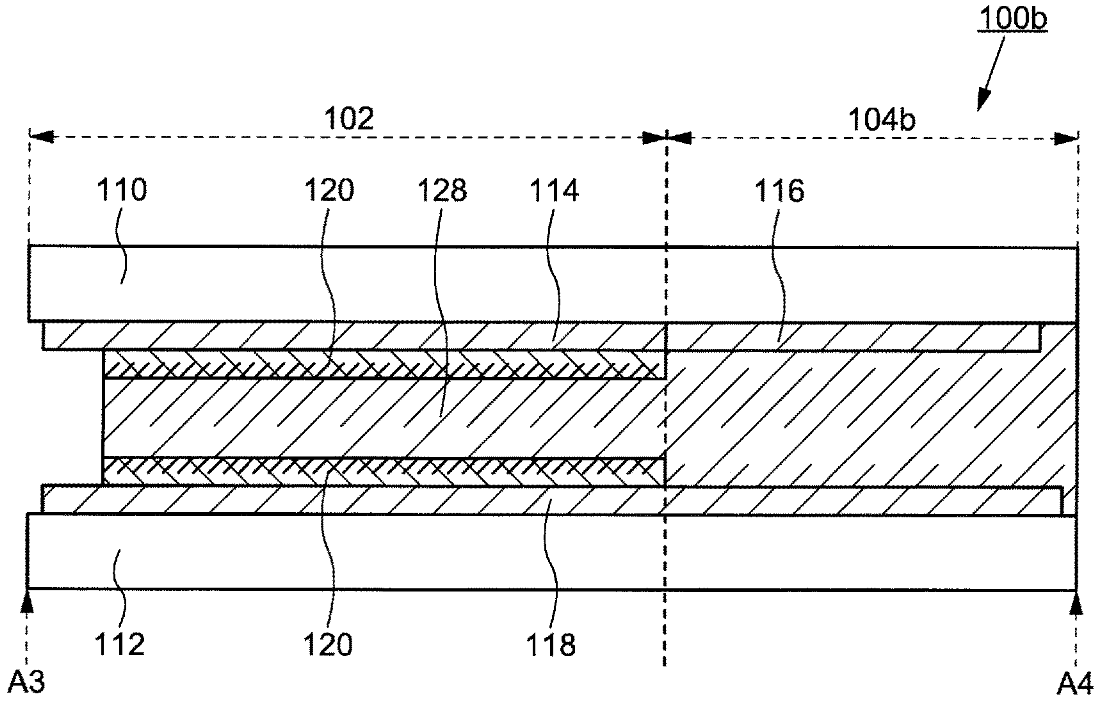
FIG. 5B shows a cross-sectional structure corresponding to the line A3-A4 shown in FIG. 5A of an antenna device according to an embodiment of the present invention.

FIG. 5A is a schematic plan view of an antenna device 100*b* according to this embodiment, and FIG. 5B is a schematic cross-sectional view taken along line A3-A4. In contrast to the first embodiment, the antenna device 100*b* according to the present embodiment has a different configuration of the planar antenna element 104*b*.

The planar antenna element 104*b* has the radiation conductor layer 116 and the ground conductor layer 118 disposed opposite to each other, and the liquid crystal layer 128 disposed therebetween. That is, the planar antenna element 104*b* according to the present embodiment has a configuration in which the alignment film is omitted, and the radiation conductor layer 116 and the ground conductor layer 118 directly contact the liquid crystal layer 128. On the other hand, the phase shifter 102 has the same configuration as that of the first embodiment. The liquid crystal layer 128 continuously extends from the region of the phase shifter 102 to the region of the planar antenna element 104*b*.

Figure 6A:
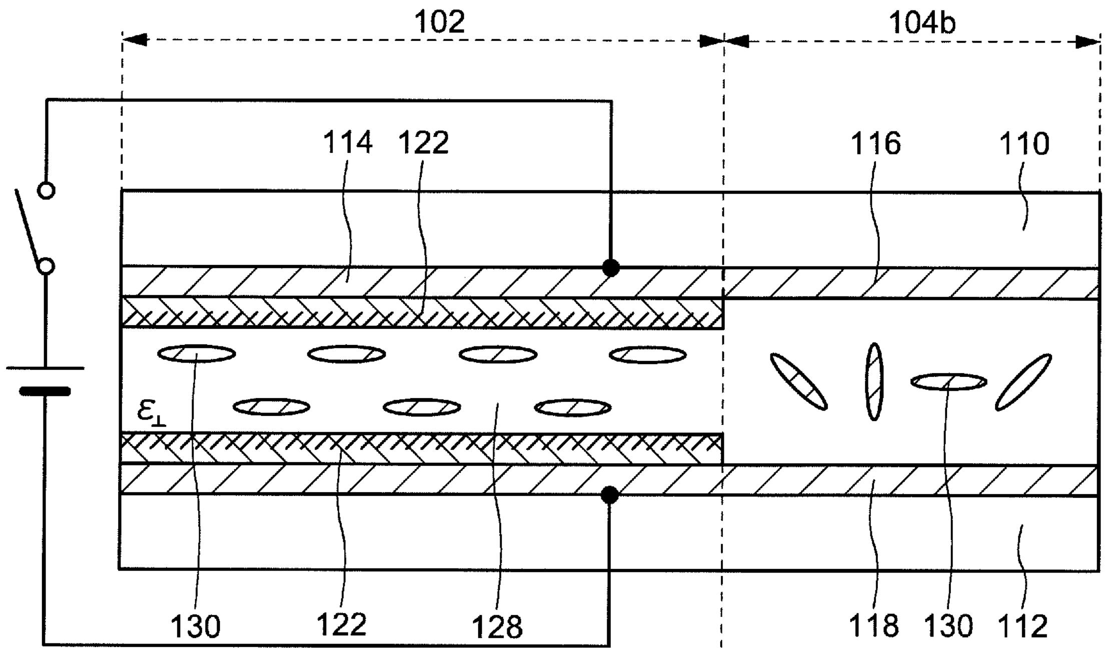
FIG. 6A shows an alignment state in which a bias voltage of liquid crystal molecules as a dielectric layer is not applied in an antenna device according to an embodiment of the present invention.

2-2. Behavior of Liquid Crystal Molecules in Phase Shifter and Planar Antenna Element FIG. 6A shows the configuration of the phase shifter 102 and the planar antenna element 104*b* in the antenna device 100*b*. The liquid crystal layer 128 is a positive liquid crystal. The antenna device 100*b* has a structure in which the horizontal alignment film 122 is disposed in the region of the phase shifter 102 and the alignment film is not disposed in the plane antenna element 104*b*.

As shown in FIG. 6A, the liquid crystal layer 128 in the region of the phase shifter 102 has the liquid crystal molecules 130 aligned horizontally by the effect of the horizontal alignment film 122 in a state where no bias voltage is applied. On the other hand, the liquid crystal layer 128 in the region of the planar antenna element 104*b* has no alignment film, so that the liquid crystal molecules are randomly aligned.

Figure 6B:
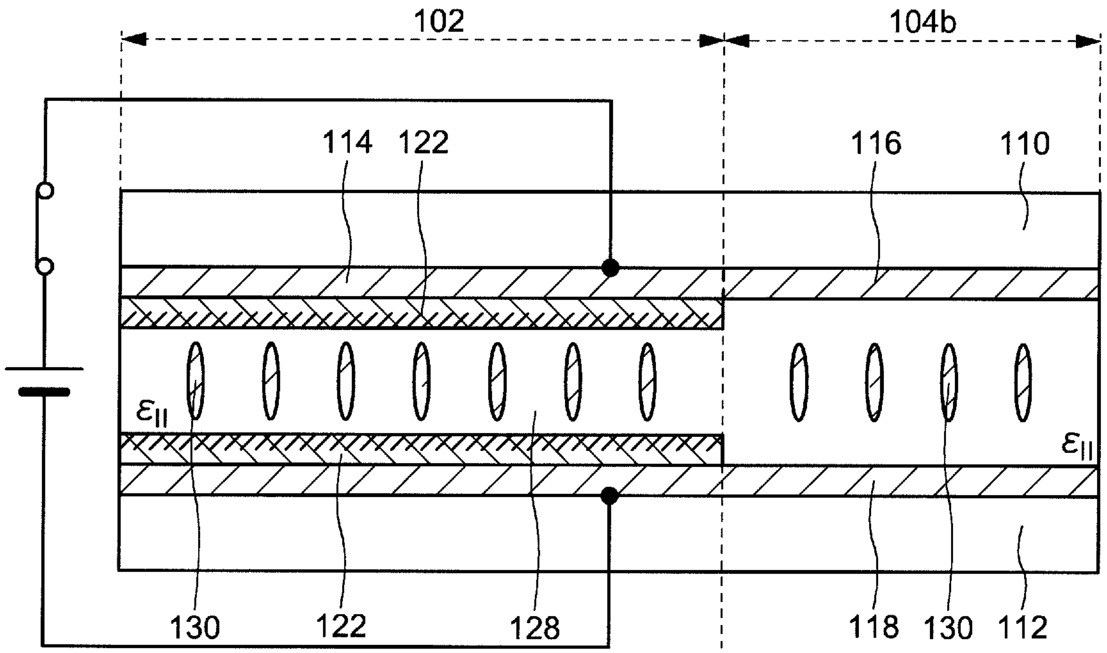
FIG. 6B shows an alignment state in which a bias voltage of liquid crystal molecules as a dielectric layer is applied in an antenna device according to an embodiment of the present invention.

FIG. 6B shows a state in which a bias voltage is applied to the phase shifter 102 with respect to FIG. 6A. In this state, the strip conductor layer 114 and the radiation conductor layer 116 are biased to the same potential, and a DC electric field is formed between the ground conductor layer 118 and the strip conductor layer 114, and between the ground conductor layer 118 and the radiation conductor layer 116. The liquid crystal layer 128 in the region of the phase shifter 102 is vertically aligned with the liquid crystal molecules 130 by the action of the DC electric field. The liquid crystal molecules 130 which are randomly oriented are vertically aligned by the effect of the DC electric field also in the planar antenna element 104*b*.

The liquid crystal layer 128 has a large change in dielectric constant because the alignment state of the liquid crystal molecules 130 located in the region of the phase shifter 102 changes greatly from a horizontal alignment to a vertical alignment. On the other hand, while the liquid crystal molecules 130 located in the region of the planar antenna element 104*b* change from a random state to the vertical alignment, the change in the dielectric constant of the liquid crystal layer 128 becomes small. Therefore, the variation of the resonance frequency in the planar antenna element 104*b* can be reduced.

Figure 7A:
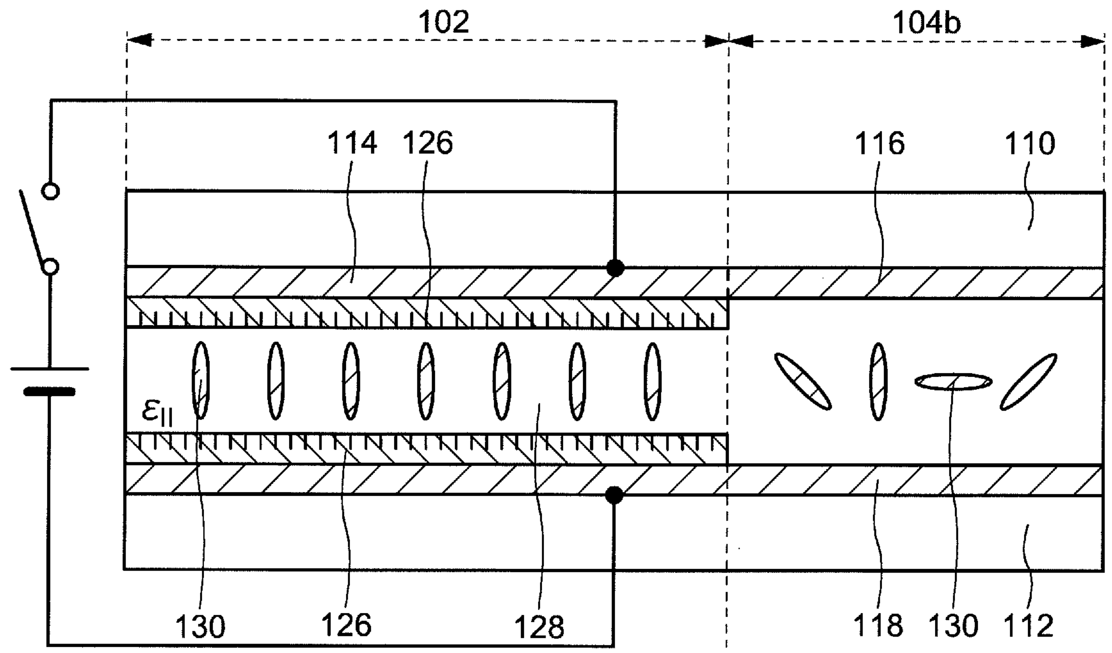
FIG. 7A shows an alignment state in which a bias voltage of liquid crystal molecules as a dielectric layer is not applied in an antenna device according to an embodiment of the present invention.

FIG. 7A shows an embodiment in which the vertical alignment film 126 is disposed in the phase shifter 102 and the alignment film is not disposed in the planar antenna element 104*b* when a negative liquid crystal is used for the liquid crystal layer 128. As shown in FIG. 7A, the liquid crystal molecules 130 in the region of the phase shifter 102 are vertically aligned when the bias voltage is not applied. On the other hand, the alignment of the liquid crystal molecules 130 in the region of the planar antenna element 104*b* is random.

Figure 7B:
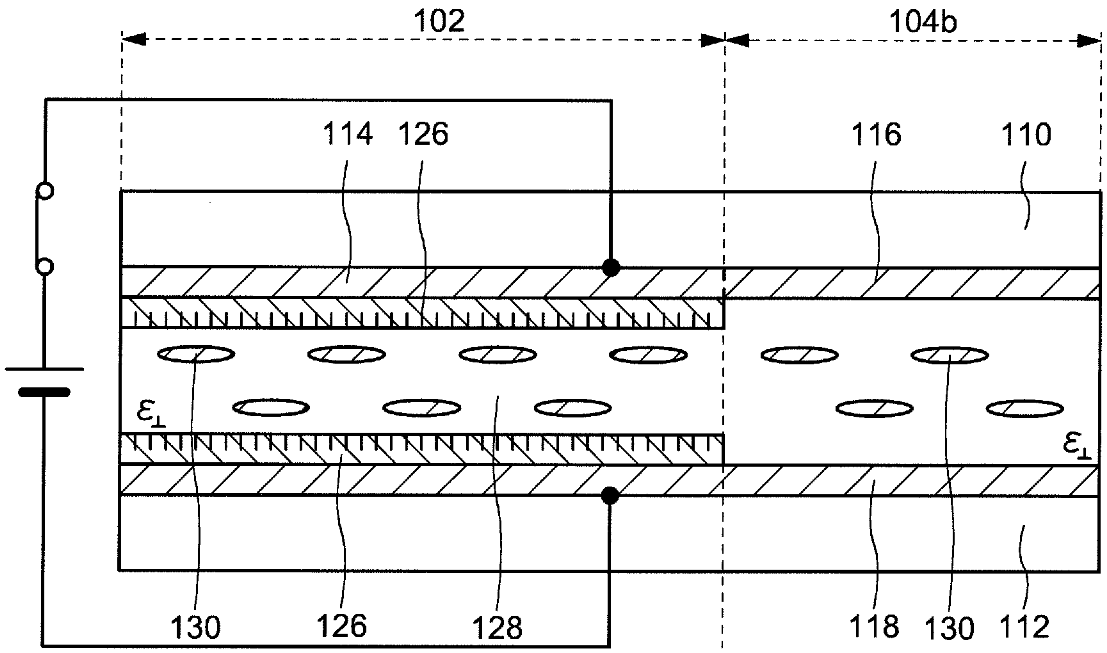
FIG. 7B shows an alignment state in which a bias voltage of liquid crystal molecules as a dielectric layer is applied in an antenna device according to an embodiment of the present invention.

FIG. 7B shows a state in which the bias voltage is applied to the phase shifter 102 with respect to FIG. 7A. The liquid crystal molecules 130 in the region of the phase shifter 102 are horizontally aligned by the bias voltage. The liquid crystal molecules 130 in the planar antenna element 104*b* are also horizontally aligned by the effect of the DC electric field. In this case, the dielectric constant of the liquid crystal layer 128 greatly changes in the region of the phase shifter 102, while the change amount of the dielectric constant of the liquid crystal layer 128 in the region of the planar antenna element 104*b* becomes small, similar to FIG. 6B. Therefore, the variation of the resonance frequency in the planar antenna element 104*b* can be reduced.

Although this embodiment shows a mode in which the alignment film is not provided in the region of the planar antenna element 104*b*, instead of this mode, the horizontal alignment film 122 or the vertical alignment film 126 may be provided on the entire surface of the region of the phase shifter 102 and the planar antenna element 104*b*, and an opening may be provided for exposing substantially the entire surface or at least a part of the radiation conductor layer 116.

2-3. Conclusion

According to the present embodiment, the antenna device 100*b* integrated with the phase shifter 102 and the planar antenna element 104*b* utilizes a plurality of kinds of alignment films having different alignment characteristics, whereby the phase of the high frequency signal is controlled by the phase shifter 102 and the resonance frequency is not largely changed by the planar antenna element 104*b*. That is, according to the configuration of this embodiment, the liquid crystal layer 128 can be commonly used as a dielectric layer for forming the phase shifter 102 and the planar antenna element 104*b*, and the frequency characteristic of the antenna device 100*b* can be stabilized.

Third Embodiment

This embodiment shows a configuration different from that of the first embodiment and the second embodiment in an antenna device including the phase shifter and the planar antenna element. In the following description, an explanation will be focused on the parts different from the first embodiment.

3-1. Structure of Antenna Device

Figure 8A:
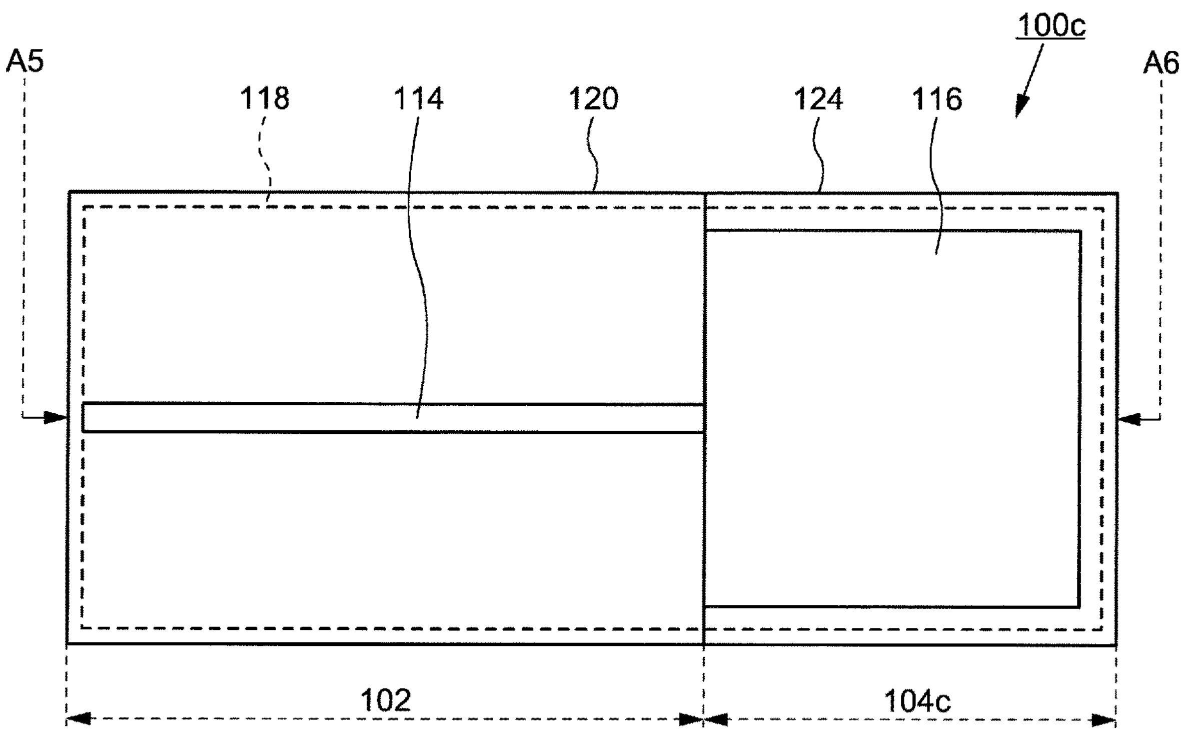
FIG. 8A shows a plan view of an antenna device according to an embodiment of the present invention.
Figure 8B:
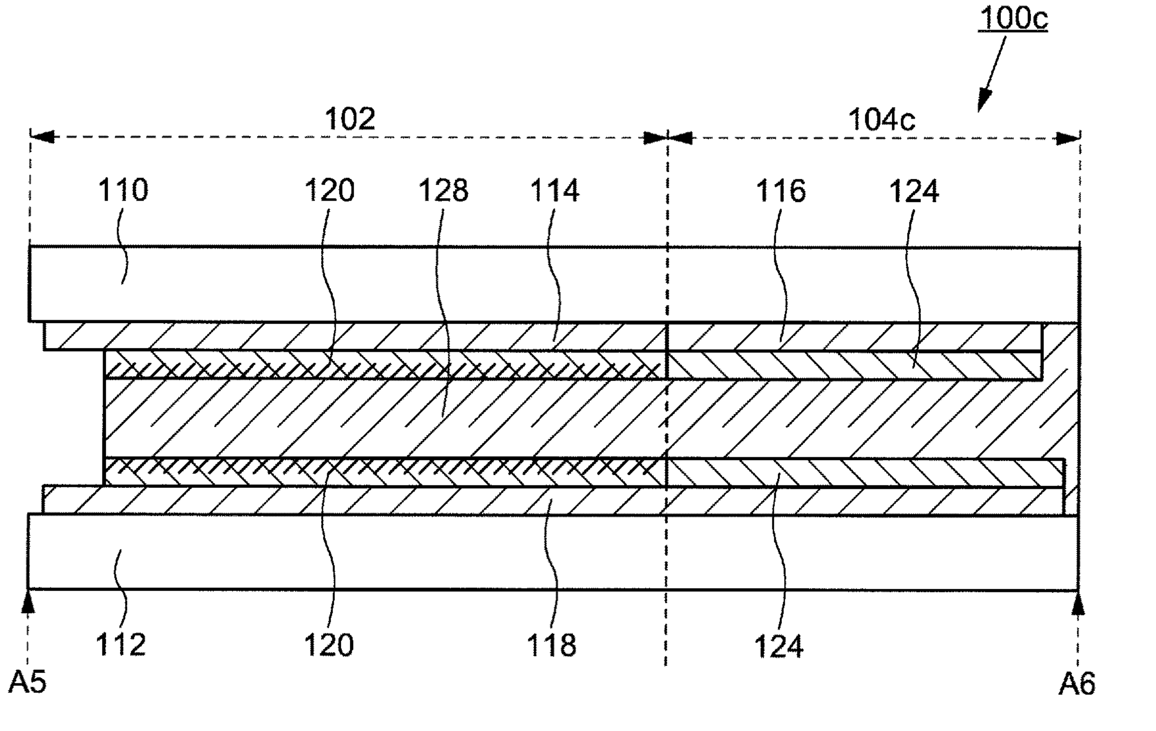
FIG. 8B shows a cross-sectional structure corresponding to the line A5-A6 shown in FIG. 8A of an antenna device according to an embodiment of the present invention.

FIG. 8A is a schematic plan view of an antenna device 100*c* according to this embodiment, and FIG. 8B is a schematic cross-sectional view taken along line A5-A6. The antenna device 100*c* of this embodiment is different from the first embodiment in the configuration of the alignment film in the planar antenna element 104*c*.

The planar antenna element 104*c* has the radiation conductor layer 116 and the ground conductor layer 118 disposed opposite to each other, and the liquid crystal layer 128 disposed therebetween. The second alignment film 124 is disposed between the radiation conductor layer 116 and the liquid crystal layer 128, and between the ground conductive layer and the liquid crystal layer 128. The antenna device 100*c* shown in FIG. 8 includes the first alignment film 120 disposed in the region of the phase shifter 102, which is subjected to alignment processing for horizontal alignment or vertical alignment. On the other hand, the second alignment film 124 disposed in the region of the planar antenna element 104*c* is not subjected to alignment processing. Therefore, the alignment of the liquid crystal molecules is different between the region of the phase shifter 102 and the region of the planar antenna element 104*c* even when the bias voltage is not applied to the phase shifter 102.

Figure 9A:
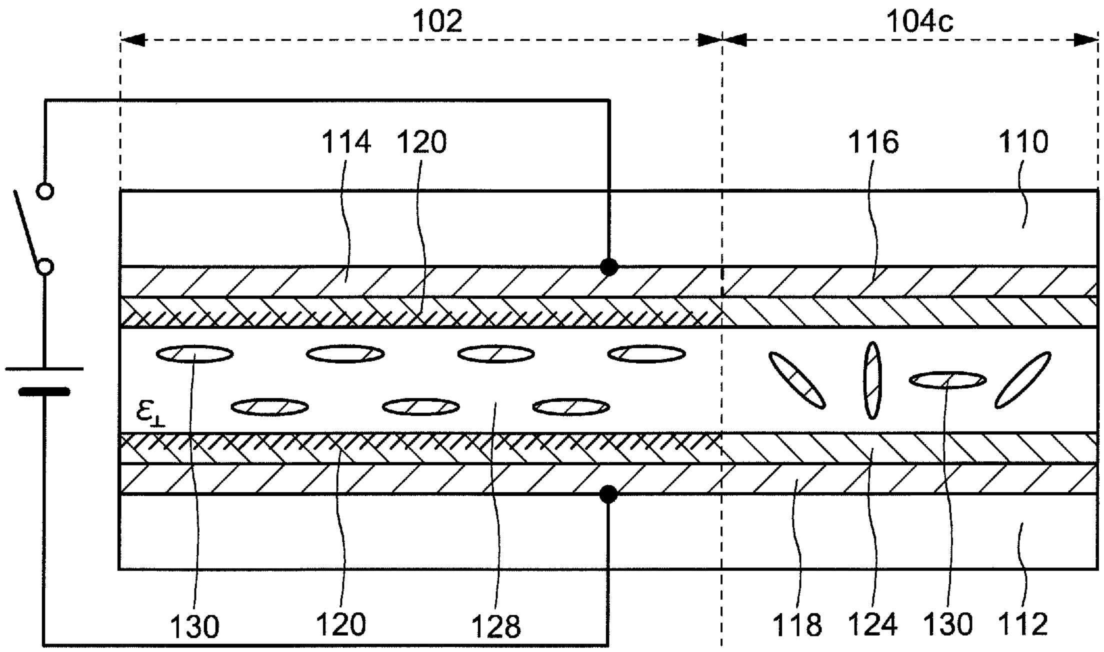
FIG. 9A shows an alignment state in which a bias voltage of liquid crystal molecules as a dielectric layer is not applied in an antenna device according to an embodiment of the present invention.

3-2. Behavior of Liquid Crystal Molecules in Phase Shifter and Planar Antenna Element FIG. 9A shows the configuration of an antenna device 100*c* including the phase shifter 102 and a planar antenna element 104*c*. The antenna device 100*c* is provided with the first alignment film 120 in the region of the phase shifter 102 and the second alignment film 124 in the region of the planar antenna element 104*c*. The first alignment film 120 is the horizontal alignment film whose surface is subjected to the horizontal alignment treatment, and the second alignment film 124 is the film which is not subjected to the specific alignment treatment. The first alignment film 120 and the second alignment film 124 are formed of the same material, can be regarded as one continuous thin film, and are distinguished by the alignment treatment. The liquid crystal layer 128 is a positive liquid crystal.

As shown in FIG. 9A, the liquid crystal molecules 130 in the region of the phase shifter 102 are horizontally aligned by the effect of the first alignment film 120 in a state where the bias voltage is not applied. On the other hand, the liquid crystal layer 128 in the region of the planar antenna element 104*c* is randomly aligned with the liquid crystal molecules 130 because the second alignment film 124 is not aligned.

Figure 9B:
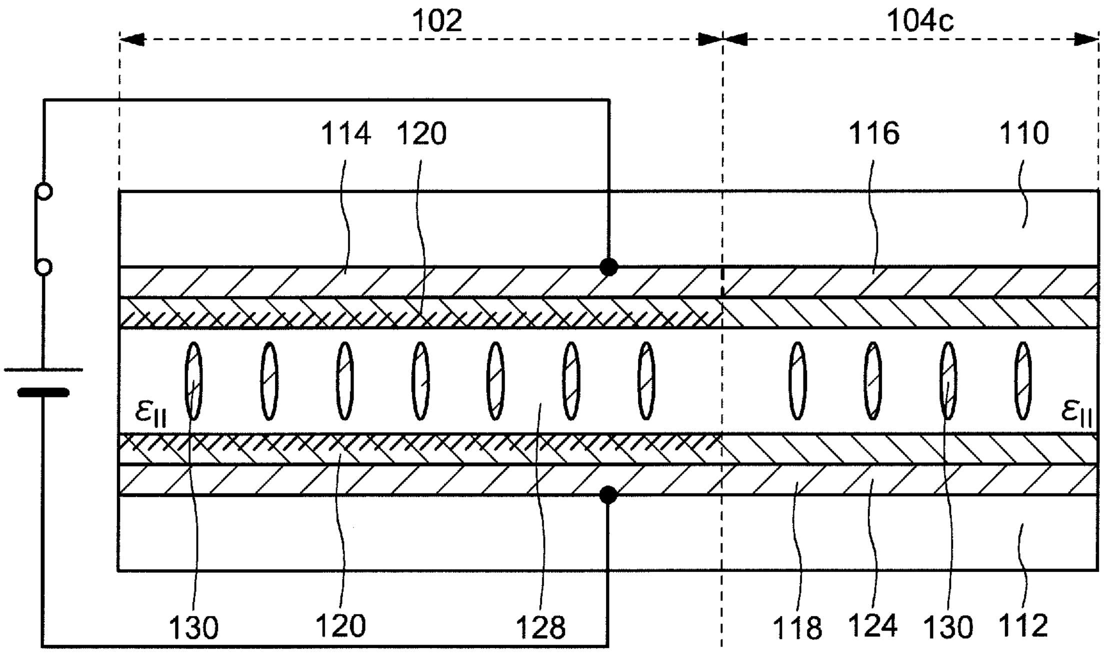
FIG. 9B shows an alignment state in which a bias voltage of liquid crystal molecules as a dielectric layer is applied in an antenna device according to an embodiment of the present invention.

FIG. 9B shows a state in which the bias voltage is applied to the phase shifter 102 with respect to FIG. 9A. In this state, the strip conductor layer 114 and the radiation conductor layer 116 are biased to the same potential, and a DC electric field is generated between the ground conductor layer 118 and the strip conductor layer 114. The liquid crystal molecules 130 are vertically aligned in the liquid crystal layer 128 in the region of the phase shifter 102 by the action of the DC electric field. Also, the liquid crystal molecules 130 randomly aligned in the planar antenna element 104*c* are vertically aligned by the effect of the DC electric field. The dielectric constant of the liquid crystal layer 128 greatly changes in the region of the phase shifter 102, while the change amount of the dielectric constant of the liquid crystal layer 128 becomes small in the region of the planar antenna element 104*c*. Therefore, the phase shifter 102 can control the phase of the high frequency signal, and the variation in the resonance frequency of the planar antenna element 104*c* can be reduced.

Figure 10A:
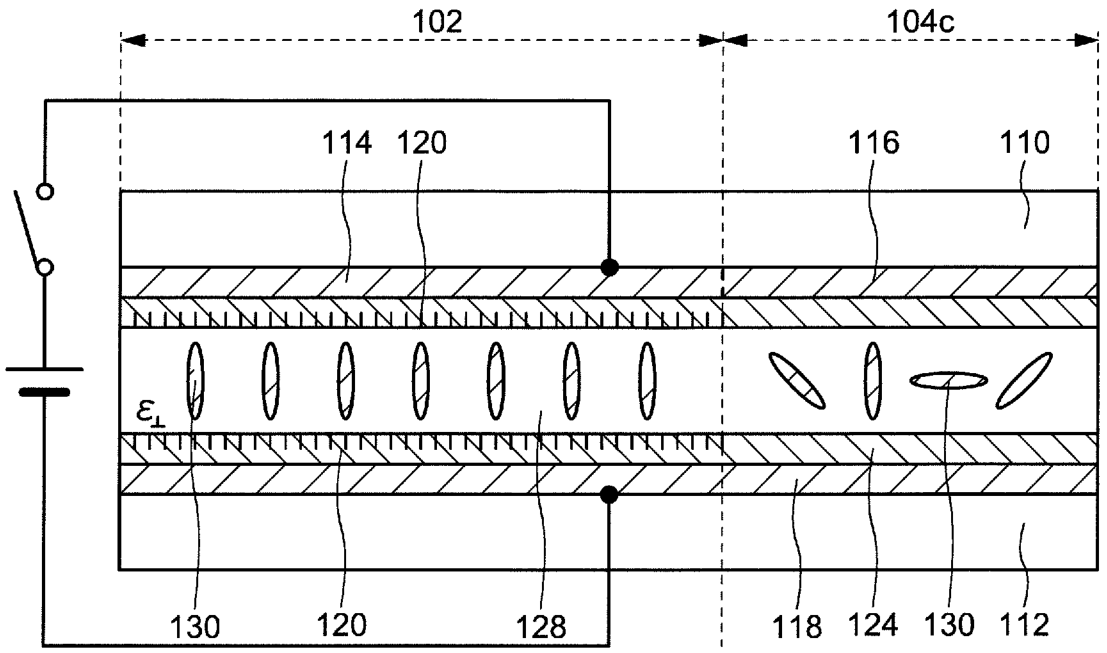
FIG. 10A shows an alignment state in which a bias voltage of liquid crystal molecules as a dielectric layer is not applied in an antenna device according to an embodiment of the present invention.

FIG. 10A shows an embodiment in which a negative liquid crystal is used for the liquid crystal layer 128, and the first alignment film 120 subjected to vertical alignment processing is disposed as the first alignment film 120 in the region of the phase shifter 102, and the second alignment film 124 not subjected to alignment processing is disposed in the region of the planar antenna element 104*c*. The liquid crystal layer 128 is a negative type of liquid crystal. As shown in FIG. 10A, the liquid crystal molecules 130 in the region of the phase shifter 102 are vertically aligned by the effect of the first alignment film 120 in a state where the bias voltage is not applied. On the other hand, the alignment of the liquid crystal molecules 130 in the region of the planar antenna element 104*b* is random.

Figure 10B:
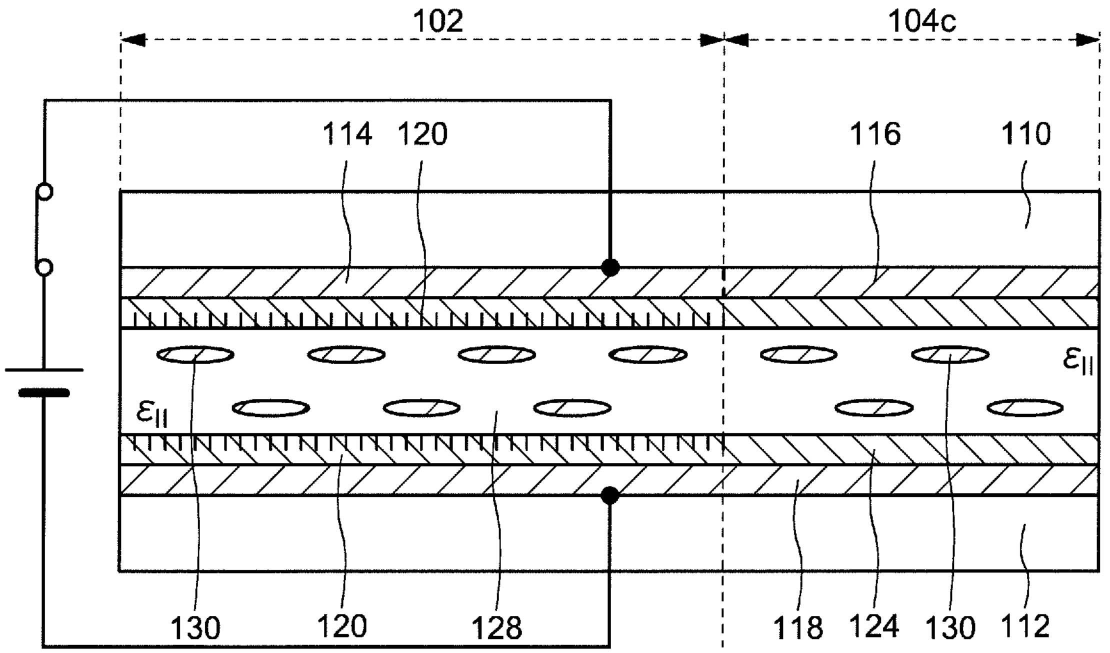
FIG. 10B shows an alignment state in which a bias voltage of liquid crystal molecules as a dielectric layer is applied in an antenna device according to an embodiment of the present invention.

FIG. 10B shows a state in which the bias voltage is applied to the phase shifter 102 with respect to FIG. 10A. The liquid crystal molecules 130 in the region of the phase shifter 102 are horizontally aligned by the bias voltage. The liquid crystal molecules 130 in the planar antenna element 104*c* are also horizontally aligned by the action of the DC electric field. In this case, similar to FIG. 9B, the dielectric constant of the liquid crystal layer 128 greatly changes in the region of the phase shifter 102, while the dielectric constant of the liquid crystal layer 128 changes only slightly in the region of the planar antenna element 104*c*. Therefore, the variation of the resonance frequency in the planar antenna element 104*c* can be suppressed to a small amount.

3-3. Conclusion

According to the present embodiment, although the antenna device 100*c* uses the same alignment film for the phase shifter 102 and the planar antenna element 104*c*, the alignment state of the liquid crystal molecules 130 differs depending on the surface alignment treatment, so that the phase shifter 102 controls the phase of the high frequency signal and the planar antenna element 104*c* does not largely change the resonance frequency. That is, according to the configuration of this embodiment, the liquid crystal layer 128 can be commonly used as a dielectric layer for forming the phase shifter 102 and the planar antenna element 104*c*, and the frequency characteristic of the antenna device 100*c* can be stabilized.

Fourth Embodiment

This embodiment shows an example of a configuration of a phased array antenna device using the antenna device shown in the first to third embodiments.

Figure 11:
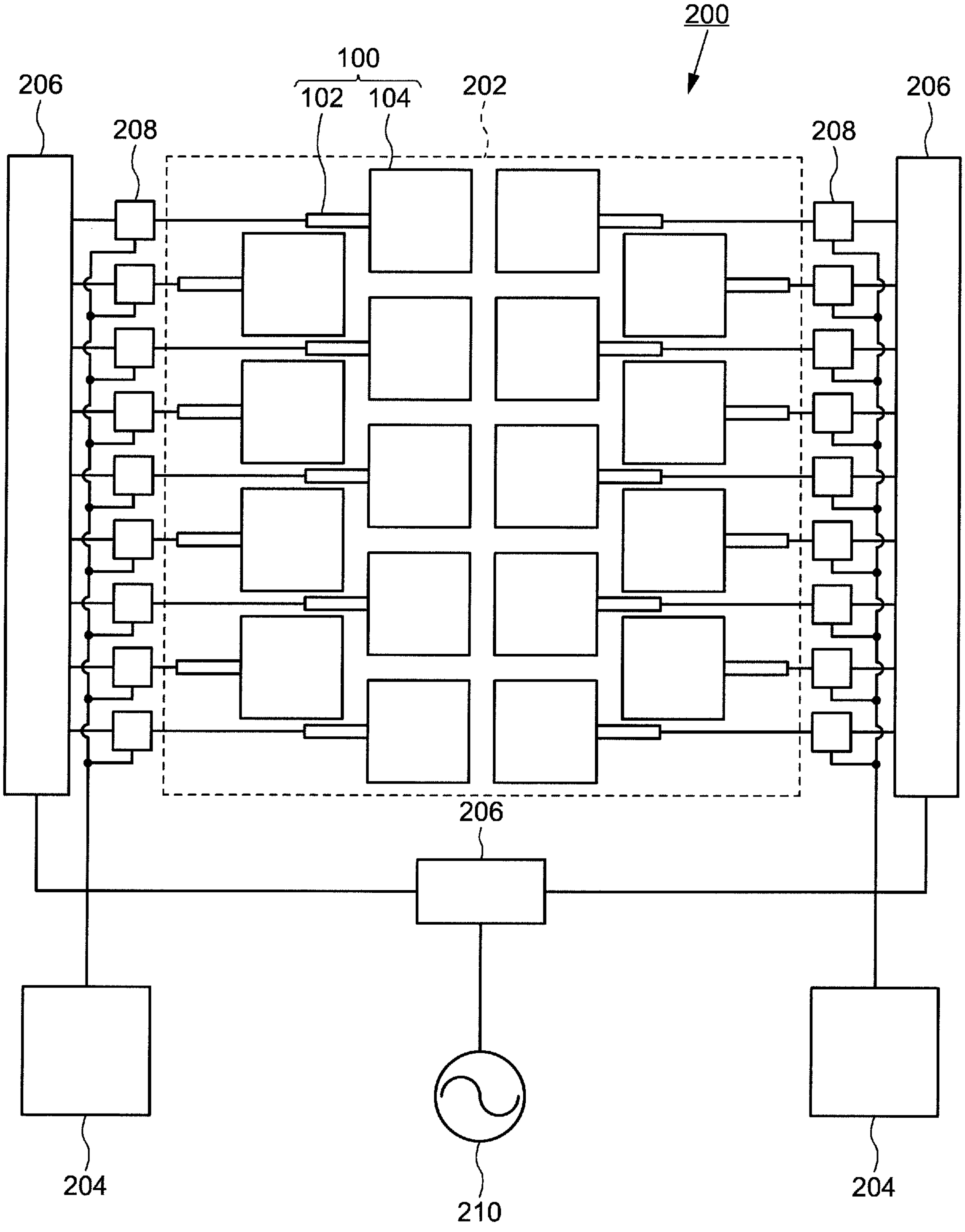
FIG. 11 shows a configuration of a phased array antenna device according to an embodiment of the present invention.

FIG. 11 shows a configuration of a phased array antenna device 200 according to this embodiment. The phased array antenna device 200 includes the antenna device 100, a phase control circuit 204, and a distributor 206. The antenna device 100 includes the phase shifter 102 and the planar antenna element 104. A plurality of antenna devices 100 are disposed in a matrix to form a planar antenna element array 202. The distributor 206 is connected to an oscillator 210 and distributes the high frequency signal to the individual antenna devices 100. An amount of phase shift of the phase shifter 102 is controlled by the phase control circuit 204. The phase control circuit 204 outputs a phase control signal for controlling the phase corresponding to each of the plurality of antenna devices 100. The phase control signal is applied to the phase shifter 102 via the bias circuit 208 together with the high frequency signal.

The electromagnetic waves radiated from each of the plurality of antenna devices 100 have coherence. Therefore, a wavefront with a uniform phase is formed by electromagnetic waves radiated from each of the plurality of antenna devices 100. The phase of the electromagnetic wave radiated from the planar antenna element 104 is adjusted by the phase shifter 102. The phase shifter 102 controls the phase of the high frequency signal radiated as an electromagnetic wave by the phase control circuit 204.

The phased array antenna device 200 supplies the high frequency signals to each of the plurality of antenna devices 100 by the phase control circuit 204, and the phase of each high frequency signal is individually adjusted by the phase shifter 102. Thus, the propagation direction of the wavefront of the electromagnetic wave radiated from the plurality of antenna devices 100 can be controlled at an arbitrary angle. The phased array antenna device 200 controls the directivity of the radiated electromagnetic wave by controlling the respective phases of the plurality of antenna devices 100.

FIG. 11 shows a case where the phased array antenna device 200 is for signal transmission. On the other hand, when the phased array antenna device 200 is for use in signal reception, the oscillator 210 is replaced with a high frequency amplifier, whereby the electromagnetic wave received by the planar antenna element array 202 can be amplified and the signal can be output to a subsequent circuit such as a demodulation circuit.

The antenna device 100 constituting the planar antenna element array 202 is applied as shown in the first to third embodiments. The antenna device 100 can miniaturize the phased array antenna device 200 because the phase shifter 102 and the planar antenna element 104 are integrated. The antenna device 100 can shift the phase of the high frequency signal and suppress the fluctuation of the resonance frequency of the planar antenna element 104 to a small amount, so that the phased array antenna device 200 can transmit (or receive) signals with high directivity.

What is claimed is:

1. An antenna device comprising:
a strip conductor layer;
a radiation conductor layer continuous from the strip conductor layer;
a ground conductor layer facing the strip conductor layer and the radiation conductor layer;
a liquid crystal layer between the strip conductor layer and the ground conductor layer, and the radiation conductor layer and the ground conductor layer; and
an alignment film between the strip conductor layer and the liquid crystal layer, and the radiation conductor layer and the liquid crystal layer,
wherein the alignment film includes a first region overlapping the strip conductor layer and a second region overlapping the radiation conductor layer, and the alignment state of liquid crystal molecules of the liquid crystal layer in the first region is different from the alignment state of liquid crystal molecules of the liquid crystal layer in the second region.

2. The antenna device according to claim 1, wherein
the liquid crystal layer includes a liquid crystal having a positive dielectric constant anisotropy, and
the liquid crystal molecules in the first region are horizontally aligned and the liquid crystal molecules in the second region are vertically aligned in a state where a bias voltage is not applied to the strip conductor layer.

3. The antenna device according to claim 1, wherein
the liquid crystal layer includes a liquid crystal having a negative dielectric constant anisotropy, and
the liquid crystal molecules in the first region are vertically aligned and the liquid crystal molecules in the second region are horizontally aligned in a state where a bias voltage is not applied to the strip conductor layer.

4. The antenna device according to claim 1, wherein
the liquid crystal layer includes a liquid crystal having a positive dielectric constant anisotropy, and
the alignment film includes a horizontal alignment film disposed in the first region and a vertical alignment film disposed in the second region.

5. The antenna device according to claim 1, wherein
the liquid crystal layer includes a liquid crystal having a negative dielectric constant anisotropy, and
the alignment film includes a vertical alignment film disposed in the first region and a horizontal alignment film disposed in the second region.

6. An antenna device, comprising:
a strip conductor layer;
a radiation conductor layer continuous from the strip conductor layer;
a ground conductor layer facing the strip conductor layer and the radiation conductor layer;
a liquid crystal layer between the strip conductor layer and the ground conductor layer, and the radiation conductor layer, and the ground conductor layer; and
an alignment film in contact with the liquid crystal layer,
wherein the alignment film aligns the liquid crystal molecules of the liquid crystal layer in a region in contact with the strip conductor layer and exposes the radiation conductor layer.

7. The antenna device according to claim 6, wherein
the liquid crystal layer includes a liquid crystal having a positive dielectric constant anisotropy, and
the alignment film is a horizontal alignment film for horizontally aligning the liquid crystal molecules.

8. The antenna device according to claim 6, wherein
the liquid crystal layer includes a liquid crystal having a negative dielectric constant anisotropy, and
the alignment film is a horizontal alignment film for vertically aligning the liquid crystal molecules.

9. An antenna device comprising:
a strip conductor layer;
a radiation conductor layer continuous from the strip conductor layer;
a ground conductor layer facing the strip conductor layer and the radiation conductor layer;
a liquid crystal layer between the strip conductor layer and the ground conductor layer, and the radiation conductor layer and the ground conductor layer; and
an alignment film between the strip conductor layer and the liquid crystal layer, and the radiation conductor layer and the liquid crystal layer,
wherein the alignment film aligns the liquid crystal molecules of the liquid crystal layer in a first region overlapping the strip conductor layer, and randomly aligns the alignment of the liquid crystal molecules of the liquid crystal layer in a second region overlapping the radiation conductor layer.

10. The antenna device according to claim 9, wherein
the liquid crystal layer includes a liquid crystal having a positive dielectric constant anisotropy, and
the liquid crystal molecules in the first region are horizontally aligned and the liquid crystal molecules in the second region are vertically aligned in a state where a bias voltage is not applied to the strip conductor layer.

11. The antenna device according to claim 9, wherein
the liquid crystal layer includes a liquid crystal having a negative dielectric constant anisotropy, and
the liquid crystal molecules in the first region are vertically aligned and the liquid crystal molecules in the second region are horizontally aligned in a state where a bias voltage is not applied to the strip conductor layer.

12. The antenna device according to claim 9, wherein
the liquid crystal layer includes a liquid crystal having a positive dielectric constant anisotropy, and
the alignment film includes a horizontal alignment film disposed in the first region.

13. The antenna device according to claim 9, wherein
the liquid crystal layer includes a liquid crystal having a negative dielectric constant anisotropy, and
the alignment film includes a vertical alignment film disposed in the first region.

14. The antenna device according to claim 1, wherein the liquid crystal layer is one kind selected from nematic liquid crystal, smectic liquid crystal, cholesteric liquid crystal, discotic liquid crystal and ferroelectric liquid crystal.

15. The antenna device according to claim 6, wherein the liquid crystal layer is one kind selected from nematic liquid crystal, smectic liquid crystal, cholesteric liquid crystal, discotic liquid crystal and ferroelectric liquid crystal.

16. The antenna device according to claim 9, wherein the liquid crystal layer is one kind selected from nematic liquid crystal, smectic liquid crystal, cholesteric liquid crystal, discotic liquid crystal and ferroelectric liquid crystal.

17. A phased array antenna device comprising:
a plurality of antenna devices,
each of the plurality of antenna devices comprising:
a strip conductor layer;
a radiation conductor layer continuous from the strip conductor layer;
a ground conductor layer facing the strip conductor layer and the radiation conductor layer;
a liquid crystal layer between the strip conductor layer and the ground conductor layer, and the radiation conductor layer and the ground conductor layer; and
an alignment film between the strip conductor layer and the liquid crystal layer, and the radiation conductor layer and the liquid crystal layer,
wherein the alignment film includes a first region overlapping the strip conductor layer and a second region overlapping the radiation conductor layer, and the alignment state of liquid crystal molecules of the liquid crystal layer is different in the first region and the second region,
wherein each radiation conductive layer of the plurality of antenna devices is radially arranged.

* * * * *